Patented June 22, 1926.

1,589,757

UNITED STATES PATENT OFFICE.

ALBERT F. HARDMAN, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

ACCELERATOR FOR RUBBER VULCANIZATION.

No Drawing.    Application filed June 24, 1925. Serial No. 39,389.

This invention relates to improvements in accelerators for rubber vulcanization and to the art of producing them. The class of accelerators concerned being the substituted guanidines, particularly diphenylguanidine and its homologues, in useful association with other beneficial elements in a master batch; all as fully developed by the accompanying specification.

It is, of course, well known that substituted guanidines, such as diphenylguanidine and its homologues such as ditolylguanidine and phenyltolyl-guanidine, are very desirable accelerators of vulcanization and as such are widely used in the rubber industry. Since the desirable properties of these substances are well known to those familiar with the art, a detailed discussion of their uses does not seem necessary here. However, it is not so well known that the manufacture of these substances by methods disclosed in the literature and patented art presents certain difficult features that have made the production cost of these accelerators relatively high. For example, in the manufacture of diphenylguanidine, it is customary to treat a mixture of thiocarbanilide and some metallic oxide or salt with ammonia, or ammonium salts, usually in the presence of some organic solvent, such as alcohol. Metallic oxides which have been mentioned as suitable for this reaction are those of mercury, lead and zinc, all of which react readily with hydrogen sulfide to produce stable, insoluble sulfides and thus remove the hydrogen sulfide from the reacting system. This reaction may be represented by the general formula:—

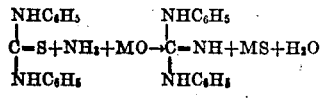

where "M" represents one of the metals mentioned above, or any other that may be found suitable.

This method of manufacture, aside from the slowness of reaction and uncertainty of yield obtained thereby, has the inherent disadvantage of requiring expensive solvents both for the reaction process, and for the subsequent extraction and recrystallization processes by which the accelerator is free not only from the insoluble metallic sulfides but also from certain undesirable organic materials which are always formed to a limited extent by various side reactions during the course of the general process. The recovery of these solvents is not only expensive in itself, but also constitutes a fire hazard of no small moment. The diphenylguanidine thus obtained must then be treated by a careful grinding and sifting process before it can be used for rubber compounding, otherwise a poor dispersion would be obtained in rubber mixings, with subsequent "spotting" and the production of an inferior vulcanized product.

The reactions illustrated in the formula above can, it is true, be carried out in a dry state by treating thiocarbanilide, very intimately mixed with an excess of a suitable metallic oxide with dry ammonia gas under suitable conditions of temperature and pressure, but the difficulty here is that the reaction mass has a tendency to form a very hard cake during the process, which is difficult to grind, after which the use of solvents is still required for extraction and crystallization in order to obtain the free accelerator.

Being fully cognizant of the practical limitations and disadvantages above mentioned, the present invention relates to a new and useful process for the manufacture and use in the form produced of substituted guanidines, particularly of diphenylguanidine and its homologues such as ditolylguanidine and phenyltolyl guanidine, by which all use of solvents with attendant cost of recovery and fire hazard is eliminated; by which all grinding operations are rendered unnecessary; and by which all waste of material in useless by-products is reduced to a minimum.

This particular illustrative process as specifically related to the production of diphenylguanidine, consists essentially in incorporating in a rubber matrix or other carrier, by any of the well known mixing methods a suitable quantity of thiocarbanilide or other substituted thiourea, together with an excess of a metallic oxide, preferably zinc oxide, and treating the rubber mixture so formed with gaseous ammonia under pressure. This is best accomplished by exposing the mixture in the form of thin sheets to the ammonia gas in a closed container, although any suitable method by which the ammonia gas is brought into contact with a large surface of the rubber mix may be employed. During such treatment I have found that the substituted thiourea is smoothly and efficiently converted into the corresponding guanidine, so that in the course of a few hours, depending on the temperature, gas pressure and thickness of sheets exposed, a product is obtained containing, in event of the use of a metallic oxide, a substantial percentage of diphenylguanidine or other substituted guanidine, together with metallic oxide, metallic sulfide and small amounts of organic reaction products which have not been identified. This so obtained rubber-accelerator mixture may now be used directly and without further treatment as an accelerator master batch, as is customary in rubber compounding, and well known to all skilled in the art. The metallic oxide and sulfide contained in the mixture are not objectionable, especially if zinc oxide is used, since, as is well known, this material is almost universally used in all types of rubber compounds. The small amounts of organic materials mentioned above have been found in practice to have no injurious effect on rubber goods vulcanized with the aid of such a master batch, but have indeed a mild accelerating effect aside from value as a mere filler. Furthermore, the accelerating agent or agents in such a master batch are found to be in such physical condition that perfect dispersion is easily obtained in any type of rubber mixing, thereby insuring uniform vulcanization and freedom from "accelerator spots" or similar imperfections in the vulcanized article.

Also, it is within the scope of this invention to utilize a substituted thiourea, other than thiocarbanilide, mixed with a metallic oxide and a carrier, and treated with ammonia, whereby the resulting product will contain a substituted guanidine, metallic oxide and metallic sulfide.

In view of the fact that I consider the production of diphenylguanidine from thiocarbanilide, mixed with a suitable metallic oxide and treated with ammonia, the more important of the several variations herein included as a part of this invention, this specific product will be more fully discussed. The other variations follow the general reaction specified and can be readily practiced by those skilled in this art without the necessity for further detailed instructions.

Where, in the original mix, thiocarbanilide or other substituted thiourea is used with a suitable metallic oxide, the resulting product is stated to be characterized by the presence of metallic oxide and metallic sulfide. It should here be stated that this is a preferred result, attained by the inclusion of an excess of the metallic oxide in the original mix. This proportion and its results do not constitute limitations of the invention, for it would be possible to eliminate the metallic oxide from the resultant product by employing, in the original mix, the exact amount required for the chemical reaction whereby the substituted guanidine and metallic sulfide is produced.

The process described above may be conveniently practiced in the following manner, the example chosen relating to diphenylguanidine as the objective reaction product:

30 lbs. thiocarbanilide and 20 lbs. zinc oxide are mixed on an ordinary rubber mill with 50 lbs. of crude rubber. The mixture is sheeted out to a thickness of 30 to 50 thousandths of an inch by passing through a calender and rolling up in a liner in the manner familiar to all skilled in the art. The sheets so formed are cut to any convenient dimensions and hung or otherwise placed in a vessel which is thereafter tightly closed by suitable gas tight sealing devices. The air in the vessel is then best removed by means of a vacuum pump, and ordinary, dry ammonia gas is admitted to a pressure of 30 to 50 lbs. which pressure is maintained for a period of 10 to 20 hours, or until the reaction is complete, the time required depending largely on the pressure used. The reaction is best carried out at ordinary temperatures, that is, at 25° to 30° C., although it should be distinctly understood that I do not limit myself to any particular conditions of pressure, temperature, or composition and thicknes of rubber sheets, since these factors may be widely varied and the process still carried out with entire success. After the completion of such treatment the sheets of rubber compound will be found to contain 20% or more of diphenylguanidine, and may then be incorporated in any desired proportion with other rubber mixtures in order to introduce therein the desired quantity of accelerating material.

The advantages, therefore, of the process just outlined for the production of accelerators of vulcanization of substituted guanidine, particularly the diphenylguanidine type, over other methods in common practice may be summarized as follows:

Use of expensive solvents is eliminated.

Fire hazards from use of materials such as alcohol, or benzol, etc are eliminated.

Crystallization of product rendered unnecessary.

Grinding and sifting of finished product is eliminated.

A convenient master batch of accelerator in rubber is obtained in a simple manner requiring a minimum of labor and mechanical equipment.

The accelerator so obtained is in an ideal condition for easy and efficient incorporation in the usual rubber compounds.

Where the other substituted guanidines are produced by the methods specified the final reaction product will respond to the same statement of advantages above cited.

I claim:

1. The method of producing a master batch of accelerator for rubber vulcanization comprising; mixing thiocarbanilide with zinc oxide and crude rubber; exposing the bath to ammonia gas under pressure greater than one atmosphere.

2. The method of producing a master batch of accelerator for rubber vulcanization comprising; mixing thiocarbanilide with a metallic oxide and rubber; exposing the batch to ammonia gas under pressure.

3. The method of producing a master batch of accelerator for rubber vulcanization comprising; mixing thiocarbanilide with a metallic oxide and a carrier; exposing the batch to ammonia gas under pressure.

4. The method of producing a master batch of accelerator for rubber vulcanization comprising; mixing thiocarbanilide with an excess of a metallic oxide and rubber; exposing the batch to ammonia gas under pressure until a reaction occurs producing diphenylguanidine.

5. The method of producing a master batch of accelerator for rubber vulcanization comprising; mixing thiocarbanilide with a metallic oxide and a rubber content; exposing the batch to ammonia under pressure until a reaction occurs producing diphenylguanidine.

6. The method of producing a master batch of accelerator for rubber vulcanization comprising; mixing thiocarbanilide with an excess of a metallic oxide and rubber, exposing the batch to ammonia under pressure until a reaction occurs producing diphenylguanidine.

7. The method of producing a master batch of accelerator for rubber vulcanization comprising; mixing thiocarbanilide with an excess of a metallic oxide and a carrier, exposing the batch to ammonia under pressure until a reaction occurs producing diphenylguanidine.

8. The method or producing a master batch of accelerator for rubber vulcanization comprising; mixing thiocarbanilide with a metallic oxide and a carrier; enclosing the mix within a vessel; extracting a substantial amount of air; introducing ammonia gas under pressure until a reaction occurs producing diphenylguanidine.

9. The method of producing a master batch of accelerator for rubber vulcanization comprising; mixing a substituted thiourea with a metallic oxide and a carrier, exposing the batch to ammonia under pressure until a reaction occurs, producing a substituted guanidine, a sulfide of the metal, and water.

10. The method of producing a master batch of accelerator for rubber vulcanization comprising; mixing a substituted thiourea with metallic oxide and a carrier; exposing the batch to ammonia gas under pressure until a reaction occurs, producing diphenylguanidine.

11. As an accelerator for rubber vulcanization, a material formed by the reaction of ammonia under pressure on a mixture of thiocarbanilide, a metallic oxide and a carrier.

12. As an accelerator for rubber vulcanization, a material formed by the reaction of ammonia under pressure on a mixture of a substituted thiourea, a metallic oxide and a carrier.

13. As an accelerator for rubber vulcanization, a material containing diphenylguanidine, produced therein by the reaction of ammonia under pressure on an admixture of thiocarbanilide, a metallic oxide and a carrier.

14. As an accelerator for rubber vulcanization, a material containing a substituted guanidine, produced therein by the reaction of ammonia under pressure on an admixture of a substituted thiourea, a metallic oxide and a carrier.

In testimony whereof I affix my signature.

ALBERT F. HARDMAN.